United States Patent [19]
Gerszberg et al.

[11] Patent Number: 5,576,719
[45] Date of Patent: Nov. 19, 1996

[54] AUTOMATIC TELESCOPIC ANTENNA MECHANISM

[75] Inventors: Irwin Gerszberg, Kendall Park; Norman P. Graule, Hackettstown; Eugene T. Kendig, Brick Township, Ocean County, all of N.J.

[73] Assignee: Lucent Technologies Inc., Murray Hill, N.J.

[21] Appl. No.: 446,181

[22] Filed: May 19, 1995

Related U.S. Application Data

[63] Continuation of Ser. No. 125,577, Sep. 23, 1993, abandoned.
[51] Int. Cl.$^6$ ...................................................... H01Q 1/24
[52] U.S. Cl. ............................................ 343/702; 343/903
[58] Field of Search ........................... 343/702, 900–903; 455/89, 348, 351; 379/433; H01Q 1/24

[56] References Cited

U.S. PATENT DOCUMENTS

| | | | |
|---|---|---|---|
| 4,117,495 | 9/1978 | Hochstein | 343/877 |
| 4,847,629 | 7/1989 | Shimazaki | 343/713 |
| 4,920,352 | 4/1990 | Martensson et al. | 343/702 |
| 5,166,695 | 11/1992 | Chan et al. | 343/702 |

*Primary Examiner*—Michael C. Wimer

[57] ABSTRACT

An automatic telephonic antenna mechanism for a radiotelephone handset having a body and a mouthpiece hinged thereto comprises a tubular antenna channel fastened to the body, an antenna plunger slidably installed within a first end of the channel, and a flexible connector slidably installed within a second end of the channel. The flexible connector has a first end connected to the antenna plunger via a dielectric coupler and a second end fastened to the hinged mouthpiece. The mouthpiece is rotatable about the hinge between open and closed positions, whereby movement of the second end of the flexible connector operates to extend and retract the antenna plunger.

4 Claims, 1 Drawing Sheet

5,576,719

AUTOMATIC TELESCOPIC ANTENNA MECHANISM

This application is a continuation of application Ser. No. 08/125,577, filed on Sep. 23, 1993, abandoned.

BACKGROUND OF THE INVENTION

1. Field of the Invention

This invention relates to antennas, particularly to antennas for use on radiotelephone handsets, and most particularly to mechanisms for the automatic deployment and retraction of antennas for use on radiotelephone handsets.

2. Related Application

The present application is related to application Ser. No. 08/125,578, by the same inventors and assigned to the same assignee as the present application, and filed of even date herewith, to wit, Sep. 23, 1993.

3. Description of the Related Art

Radiotelephone handsets are becoming quite ubiquitous, particularly in the form of portable cellular telephones. Such a telephone typically has a retractable mouthpiece and a retractable antenna so that the telephone is as compact as possible when not in use, enabling it be carried conveniently.

To use such a telephone, a user must deploy the mouthpiece and deploy the antenna. If a user has his hands full or is preoccupied he may perform these operations in a slipshod manner, thus using the telephone with the antenna partially or completely retracted.

As is known in the prior art, such telephones are capable of operating at several different power levels, and of adjusting themselves to operate at the lowest feasible power level in order to conserve battery power. If the telephone is used with its antenna not fully deployed it may be forced to adjust itself to operate at a higher power level than necessary, thus increasing battery drain. Also, such operation may shorten the life of internal components by causing them to operate under strenuous conditions.

Such telephones are often subjected to rough handling. A user may neglect to retract the antenna when he finishes using the telephone; subsequent rough handling may damage or break the antenna.

SUMMARY OF THE INVENTION

It is a general object of the present invention to provide improved radiotelephones.

It is a particular object of the present invention to provide a radiotelephone having a retractable mouthpiece and a retractable antenna with a mechanism coupling the mouthpiece to the antenna for automatically deploying the antenna when the mouthpiece is deployed.

The present invention is to be used on a cellular telephone of the "flip-open" type, where the microphone is on a mouthpiece which is hinged to the body of the telephone, the hinge typically being toward an end of the body. In order to use the telephone a user must "flip open" the mouthpiece, thus exposing the microphone located on the mouthpiece and a keypad located on the body of the telephone. The antenna is of the telescopic type, with an antenna plunger slidably installed in a hollow antenna channel. Butted to the lower end of the antenna plunger is a flexible member which emerges from the end of the antenna channel opposite to the end into which the antenna plunger retracts, and which is fastened to the flip-open mouthpiece in such manner that opening the mouthpiece pushes the flexible member into the antenna channel thus pushing up the antenna plunger, and closing the mouthpiece pulls the flexible member out of the antenna channel thus retracting the antenna plunger.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

DESCRIPTION OF THE PREFERRED EMBODIMENTS

Figure 1:
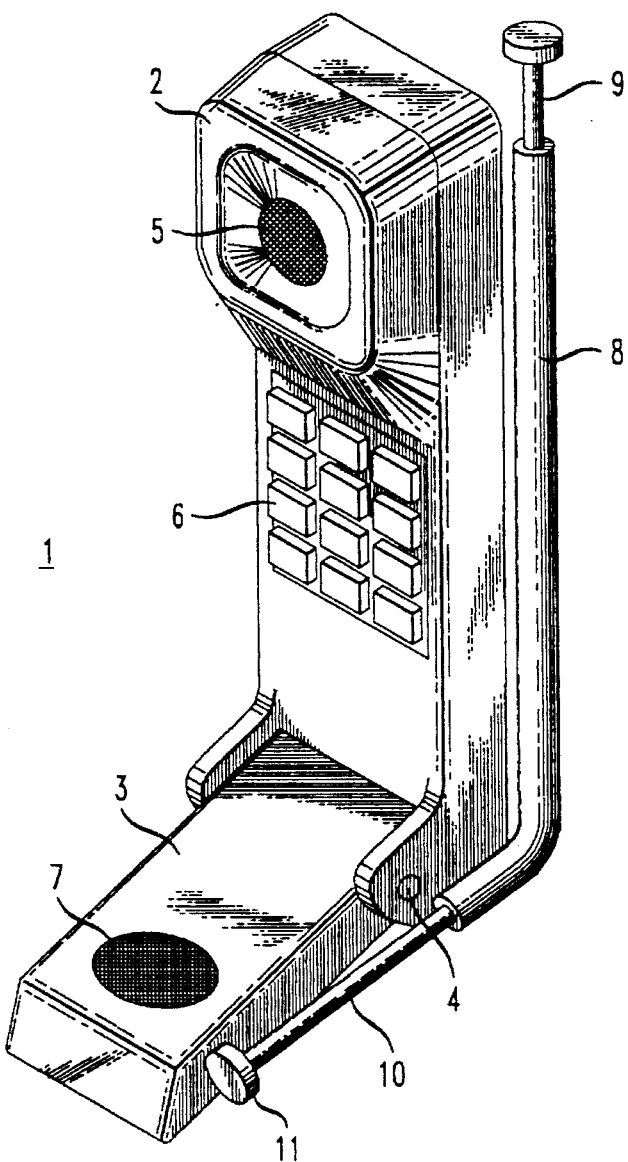
FIG. 1 is a view of a telephone handset of the present invention.

With reference to FIG. 1, a radiotelephone handset 1 comprises a body 2 with a flip-open mouthpiece 3 hinged to the body along an axis 4. The body contains speaker 5 for use against a user's ear and a keypad 6. Keypad 6 is covered when hinged mouthpiece 3 is closed. Hinged mouthpiece 3 contains a microphone 7. A rod-type antenna plunger 9 is retractable into the upper end of tubular antenna channel 8 which is fastened to body 2.

In order to use handset 1 a user must open hinged mouthpiece 3, thus configuring handset 1 such that speaker 5 may be proximate to a user's ear and microphone 7 may be simultaneously proximate to her mouth. Also, the user must ensure that the antenna plunger is extended.

In handsets of the prior art the antenna plunger must be extended manually; nothing precludes extending it only partially, or using the handset without extending the antenna plunger at all. It is known in the prior art that the handset may operate at any of several power levels and that it adjusts its power level to the lowest level for current conditions; if the antenna plunger is only partially extended or not extended at all, the handset will probably have to operate at a higher power level than if the antenna plunger were fully extended, increasing power consumption and component stress.

Similarly, it is incumbent on the user of prior-art handsets to retract the antenna plunger upon completing use of the handset; it is possible to neglect retraction of the antenna plunger in which case the antenna plunger is exposed to the possibility of damage in the event of subsequent rough handling of the handset.

The handset of the present invention automatically extends antenna plunger 9 when hinged mouthpiece 3 is opened, and automatically retracts antenna plunger 9 when hinged mouthpiece 3 is closed.

Antenna plunger 9 is substantially shorter than antenna channel 8; antenna channel 8 is curved at its bottom, and spring steel wire 10 protrudes from the curved lower end of antenna channel 8, with its upper end fastened to the bottom of antenna plunger 9. Wire 10 is covered with insulation. The outer end of wire 10 is fastened to mouthpiece 3 at attachment point 11. Antenna channel 8 and attachment point 11 may be configured so that the act of opening mouthpiece 3 causes wire 10 to be pushed into the lower end of antenna channel 8, thus pushing up antenna plunger 9.

The curvature of antenna channel 8 contains wire 10 in substantially the same curvature it would have if it were free and unstressed; when wire 10 is stressed by opening or closing of the mouthpiece antenna channel 8 confines wire 10 so that it is not free to buckle laterally.

In the preferred embodiment the path of wire 10 is outside of axis 4. (i.e., The radius from attachment point 11 to the point of maximum curvature in wire 10 is greater than the radius from attachment point 11 to axis 4.) If the path were inside of axis 4, opening mouthpiece 3 would have the adverse effect of pulling wire 10 out of antenna channel 8; if the path traversed axis 4, opening mouthpiece 3 would neither push nor pull wire 10.

The handset can thus be manufactured with a particular desired amount of antenna plunger extension as determined by the distance from axis 4 to antenna channel 8 and the position of attachment point 11. The handset of the preferred embodiment is for use at radio frequencies of 900 MHz. and 1.8 GHz.; power transfer considerations dictate that the antenna plunger must be extended approximately two inches.

Figure 2:
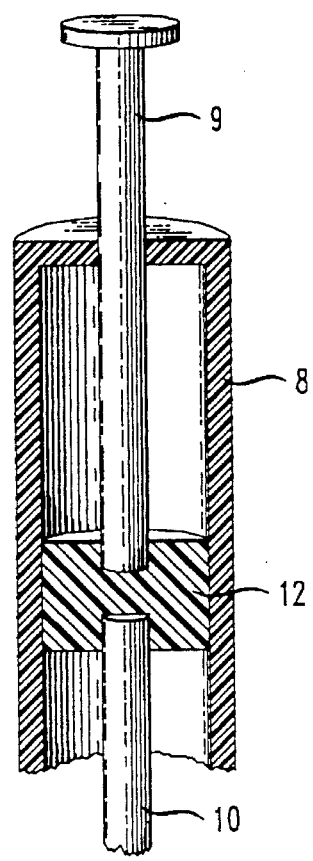
FIG. 2 shows detail of the telescopic antenna of the present invention.

Further detail is given in FIG. 2, which depicts the upper portion of antenna channel 8 as being sectioned by a plane that includes antenna channel 8's axis. Antenna plunger 9 and wire 10, both visible in FIG. 1, are shown unsectioned in FIG. 2. FIG. 2 also shows coupler 12, not visible in FIG. 1; coupler 12 is shown as being sectioned by the aforementioned plane. Coupler 12 is fastened to the lower end of antenna plunger 9 and the upper end of wire 10. Coupler 12 is made of dielectric material; thus it couples antenna plunger 9 and wire 10 together mechanically but keeps them electrically discontinuous. Wire 10, being covered with insulation, does not make electrical contact with antenna channel 8, even though it may have points of physical contact with antenna channel 8. Coupler 12 is of such diameter as to be freely slidable within antenna channel 8.

The upward push imparted to wire 10 by opening mouthpiece 3 thus results in extending antenna plunger 9 from antenna channel 8; the downward pull exerted on wire 10 by closing mouthpiece 3 thus results in retracting antenna plunger 9 into antenna channel 8.

One skilled in the art will appreciate that the invention may be embodied in other specific forms. The invention is intended to be embraced by the appended claims and not limited by the foregoing embodiment.

What is claimed is:

1. In a radiotelephone handset comprising
   a body;
   a telescopic antenna comprising
      a tubular antenna channel fastened to the body and having a first end and a second end; and
      an antenna plunger slidably installed within the first end of the antenna channel; and
   a mouthpiece hinged to the body, means responsive to a user's act of opening of the hinged mouthpiece for extending the antenna plunger, comprising:
   a flexible member having a first end and a second end;
   the first end of the flexible member slidably inserted in the second end of the antenna channel;
   the first end of the flexible member being fixed to the antenna plunger; and
   the second end of the flexible member protruding from the antenna channel and being fastened to directly the mouthpiece.

2. The radiotelephone handset of claim 1 wherein further:
   the antenna channel is curved near its second end in substantially the same curvature as the flexible member would have if it were free and in an unstressed condition,
   whereby the flexible member is confined by the antenna channel from buckling when stressed by a user's act of opening of the mouthpiece.

3. An antenna mechanism for a radiotelephone handset having a body and a mouthpiece rotatably fastened to said body about a pivot axis, said antenna mechanism comprising:
   a hollow sleeve connected to the body, said hollow sleeve comprising an elongated body portion having a longitudinal axis aligned with the longitudinal axis of said handset body:
   an antenna assembly having a first end extending from one end of said sleeve, a second end extending from the other end of said sleeve and being connected to said mouthpiece, and a central portion slidably positioned within said sleeve;
   wherein rotation of said mouthpiece causes rotation of the second end of said antenna assembly about the pivot axis to move the antenna assembly within the sleeve to extend or retract said first end of said antenna assembly; and
   wherein the other end of said sleeve is curved with respect to said elongated body portion, said second end of said antenna assembly being connected to an attachment point on the mouthpiece, and wherein the radius between the attachment point and the point of maximum curvature on said curved end of said sleeve is greater than the radius from the attachment point to the rotatable axis of the mouthpiece.

4. An antenna mechanism for a radiotelephone handset having a body and a mouthpiece movably connected to the body between an open and a closed position, said antenna mechanism comprising:
   an elongated guide channel connected to the body, said elongated guide channel having a longitudinal axis aligned with the longitudinal axis of the body;
   an integral antenna assembly extending through the guide channel and having a first end extending from a first end of the guide channel, and a second end extending from a second end of the guide channel, said second end of said antenna assembly being directly connected to the mouthpiece, whereby movement of the mouthpiece between said open and closed positions causes the antenna assembly to move within the guide channel to extend or retract the first end of the antenna assembly, the second end of the guide channel being curved with respect to its longitudinal axis; and
   wherein the mouthpiece is rotatably connected to the body and the curved end of the guide channel has a point of maximum curvature, wherein the radius between the point of connection of the mouthpiece and antenna assembly and the point of maximum curvature is greater than the radius from the connection point to the rotatable axis of the mouthpiece.

* * * * *